D. W. GARST.
Meat Cutters.
No. 151,378.
Patented May 26, 1874.
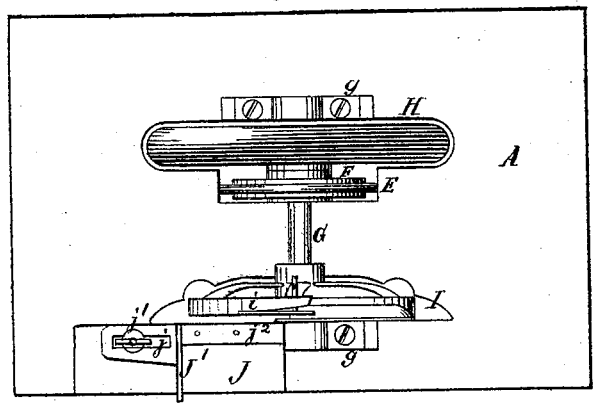
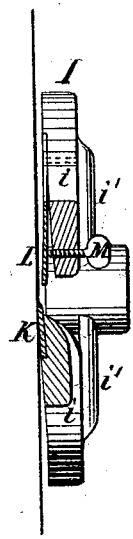
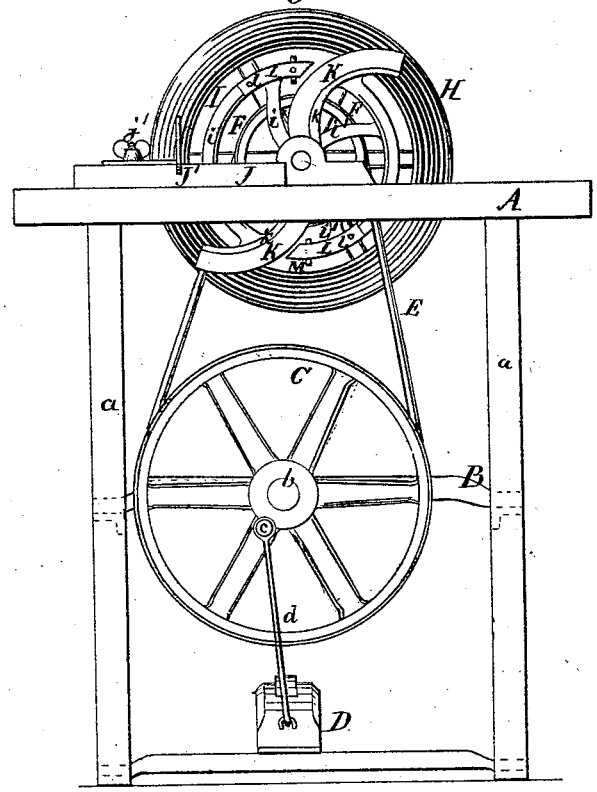
WITNESSES.
J. P. Theodore Lang
J. R. Elmont
INVENTOR.
David W. Garst
Alexander Mason
By
Attorneys.

UNITED STATES PATENT OFFICE.

DAVID W. GARST, OF WASHINGTON, DISTRICT OF COLUMBIA.

IMPROVEMENT IN MEAT-CUTTERS.

Specification forming part of Letters Patent No. 151,378, dated May 26, 1874; application filed May 2, 1874.

*To all whom it may concern:*

Be it known that I, DAVID W. GARST, of Washington, in the county of Washington and in the District of Columbia, have invented certain new and useful Improvements in Machine for Chipping and Slicing Meat; and do hereby declare that the following is a full, clear, and exact description thereof, reference being had to the accompanying drawings and to the letters of reference marked thereon, making a part of this specification.

My invention relates to machines for cutting meat; and it consists of a rotary wheel or face-plate with straight-faced and curve-edged knives, and with adjustable gages for the regulation of the thickness of the meat slices or chips to be cut. Another adjustable gage or guide is attached to the table on which the meat is placed and moved toward the rotating knives.

In order to enable others skilled in the art to which my invention appertains to make and use the same, I will now proceed to describe its construction and operation, referring to the annexed drawings, in which—

Figure 1 is a plan view of my improved meat-cutter. Fig. 2 is a front elevation of the same. Fig. 3 is a section exhibiting the operation of the same.

The machine is supported by a table, A, on the legs $a$, which are at the back connected by a cross-bar, B, to which the crank-wheel C is pivoted at $b$. The crank-wheel C is operated by a treadle, D, with the connecting-rod $d$ and the crank-pin $c$. The belt E passing around the wheel C, and the small wheel F on the shaft G, thereby communicates motion to the said shaft and to the thereto-attached fly-wheel H, and the cutter-wheel I. The shaft G is mounted on bearings $g$ on the table, which is mortised through where the motion of the above said wheels necessitates it. The cutter-wheel I consists of the rim $i$ and the arms $i'$, to which the rim is fastened in so many sections as the number of the cutters K. The said cutters are flat and curved, and so attached on a slight incline to the arms $k$, which extend from the rim to the hub of the wheel I, that their cutting-edges present a scroll, retreating from the center toward the rim of the wheel I, thus effecting the drawing of the knife-edge over the meat, which is much preferable to a vertical cut. The meat is placed on a rest or board, J, attached to the table, and held against the elbow-plate J', which, by means of the slot $j$ and thumb-screw $j^1$, is made adjustable. The front part of the board J is moved closely against the cutters K, and protected against premature wear by a plate, $j^2$, of metal. The meat is pushed forward against the rims $i$, which stand so much off the cutters K, and off the board J, as the greatest thickness of the slices to be cut, which thickness may, however, be regulated or diminished by the spring-blades L. The said blades L are riveted at $l$ to the rims $i$, which, at their free ends, are provided with the set-screws M. The said set-screws are forced with their ends against the free ends of the blades L, which thereby become more or less deflected from the rims $i$, and increase or diminish the distance from the cutters K. The arms $i$ are slightly helical, to make ample allowance of room for the chipped meat to drop out from between them and the cutters. The functions of the fly-wheel H are too well known to require explanation.

Having thus fully described my invention, what I claim as new, and desire to secure by Letters Patent, is—

In a meat-cutting machine, the combination of the wheel I with the concentric rim $i$, the cutters K, the gage-blades L, and the set-screws M, constructed and operated substantially as and for the purpose set forth.

In testimony that I claim the foregoing I have hereunto set my hand this 1st day of May, 1874.

DAVID W. GARST.

Witnesses:
G. J. FERRIS,
JAS. C. WILLIAMS.